(12) United States Patent
Li et al.

(10) Patent No.: US 10,578,285 B2
(45) Date of Patent: Mar. 3, 2020

(54) PORTABLE WORKING LIGHT APPARATUS

(71) Applicant: XIAMEN ECO LIGHTING CO. LTD., Xiamen (CN)

(72) Inventors: Ke Li, Xiamen (CN); Xiaoliang Wen, Xiamen (CN); Maojin Zeng, Xiamen (CN); Jinfan Zhang, Xiamen (CN); Xinwen Lin, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 15/921,645

(22) Filed: Mar. 14, 2018

(65) Prior Publication Data

US 2019/0285251 A1    Sep. 19, 2019

(51) Int. Cl.
| | |
|---|---|
| F21V 17/02 | (2006.01) |
| F21V 21/40 | (2006.01) |
| F21V 14/02 | (2006.01) |
| F21S 2/00 | (2016.01) |
| F21V 21/08 | (2006.01) |
| F21V 31/00 | (2006.01) |
| F21S 9/02 | (2006.01) |
| F21V 25/00 | (2006.01) |
| H04B 1/3888 | (2015.01) |
| F21Y 115/10 | (2016.01) |

(52) U.S. Cl.
CPC ............. *F21V 17/02* (2013.01); *F21S 2/005* (2013.01); *F21S 9/02* (2013.01); *F21V 14/02* (2013.01); *F21V 21/0824* (2013.01); *F21V 21/40* (2013.01); *F21V 25/00* (2013.01); *F21V 31/005* (2013.01); *F21Y 2115/10* (2016.08); *H04B 1/3888* (2013.01)

(58) Field of Classification Search
CPC .......... F21V 21/06; F21V 21/14; F21V 21/40; F21V 21/406; F21V 17/02; F21V 17/08; F21V 17/107
See application file for complete search history.

(56) References Cited

U.S. PATENT DOCUMENTS

| | | | | | |
|---|---|---|---|---|---|
| 4,407,505 | A | * | 10/1983 | Kendziorski | A63B 57/357 473/173 |
| 4,827,389 | A | * | 5/1989 | Crum | F21S 8/081 362/388 |
| 5,306,871 | A | * | 4/1994 | Lai | F21V 23/06 174/50 |
| 5,408,399 | A | * | 4/1995 | Atkins | F21L 14/00 362/310 |
| D382,075 | S | * | 8/1997 | Swyst | D26/43 |
| 6,076,635 | A | * | 6/2000 | Dame | E06C 1/39 135/65 |

(Continued)

*Primary Examiner* — Julie A Bannan
(74) *Attorney, Agent, or Firm* — Chung-Ming Shih; Lanway IPR Services (57) ABSTRACT

A portable working light apparatus has a station bracket, a first light module and a second light module. The station bracket comprising handle bar, a middle bar and a bottom base. The first light module and the second light module are placed at two sides of the bracket station. The first light module and the second light module are rotatable with respect to a surface ground and with respect to the bracket station with a first joint rotator and a second joint rotator. The first light module and the second light module may also be detached from the bracket station.

18 Claims, 8 Drawing Sheets

(56) References Cited

U.S. PATENT DOCUMENTS

| | | | | |
|---|---|---|---|---|
| 6,450,660 B1* | 9/2002 | Lee | ............... | F21V 19/04 |
| | | | | 206/418 |
| 6,824,297 B1* | 11/2004 | Lee | ............... | F21V 21/06 |
| | | | | 362/249.09 |
| 6,877,881 B2* | 4/2005 | Tsao | ............... | F21V 21/06 |
| | | | | 362/220 |
| 7,152,997 B1* | 12/2006 | Kovacik | ............ | F21V 21/06 |
| | | | | 362/249.05 |
| 2003/0103357 A1* | 6/2003 | Drake | ............ | F21L 2/00 |
| | | | | 362/403 |
| 2005/0111223 A1* | 5/2005 | Lee | ............... | F21L 14/00 |
| | | | | 362/269 |
| 2007/0221797 A1* | 9/2007 | Thompson | ......... | F16M 11/10 |
| | | | | 248/176.1 |
| 2010/0142213 A1* | 6/2010 | Bigge | ............ | F21V 21/00 |
| | | | | 362/413 |
| 2016/0327260 A1* | 11/2016 | Chaimberg | ...... | F21V 33/0052 |
| 2018/0224078 A1* | 8/2018 | Bian | ............ | F21L 4/08 |

* cited by examiner

PORTABLE WORKING LIGHT APPARATUS

FIELD OF INVENTION

The present invention is related to a working light apparatus and more particularly related to a portable working light apparatus.

BACKGROUND

There are various light devices in daily life. In modern society, light devices are an important symbol as well as tools to support today's civilization growing.

Some light devices are fixed in the ceiling like downlight devices. Some are placed on table, and some other light devices are used for various working needs. For example, a photographer needs various light devices to create a desired luminous environment. Some light devices need to be portable to be conveniently moved and placed in working environments.

Innovative light devices might not appear important as they are. But it is helpful to enhance human life when various novel light devices are invented and provided to the world. Such innovation may be on decreasing manufacturing cost, adding features, or making light devices more portable or with more functions.

Therefore, it is beneficial to continue find out innovative light designs in such crowded art. Any innovation advancement may bring certain advancement of this society, by finding new design, new technical problems and new technical solutions to bring new products.

SUMMARY OF INVENTION

According to an embodiment of the present invention, a portable working light apparatus has a station bracket, a first light module and a second light module.

The station bracket includes a handle bar, a middle bar and a bottom base. The handle bar and the bottom base are connected to the middle bar. The bottom base is used to be placed on a horizontal surface.

The first light module is disposed at a left side of the middle bar. The first light module is connected to the middle bar via a first joint connector. The first light module is rotatable with respect to the middle bar along the first joint.

Similarly, the second light module is disposed at a right side of the middle bar. The second light module is connected to the middle bar via a second joint connector. The second light module is rotatable with respect to the middle bar along the second joint connector.

In addition, the first light module and the second light module are detachable from the station bracket.

In a first case in some embodiments, the first joint connector includes a first tilt rotator and a first folding rotator. The first light module is connected to the first tilt rotator, the first tilt rotator is connected to the first folding rotator, and the first folding rotator is connected to the middle bar.

The first light module is rotated along the tilt rotator to change a tilt angle with respect to the horizontal surface. The first light module is rotated along the folding rotator to change a folding angle with respect to the middle bar.

Since the first light module and the second light module may be detachable from the bracket station, there are several types of implementation for the detaching points.

In the first type when the first light module is detached from the middle bar, the first light module is separated from the first tilt rotator.

In the second type when the first light module is detached from the middle bar, the first tilt rotator is separated from the folding rotator.

In the third type when the first light module is detached from the middle bar, the folding rotator is separated from the middle bar.

In a second case in some other embodiments, the first joint connector includes a first tilt rotator and a first folding rotator. The first light module is connected to the first folding rotator, the first folding rotator is connected to the first tilt rotator, and the first tilt rotator is connected to the middle bar.

The first light module is rotated along the tilt rotator to change a tilt angle with respect to the horizontal surface, and the first light module is rotated along the folding rotator to change a folding angle with respect to the middle bar.

Similarly, there are several types of detaching point since the first light module and the second module may be detachable from the bracket station.

In the first type when the first light module is detached from the middle bar, the first light module is separated from the first folding rotator.

In the second type when the first light module is detached from the middle bar, the first tilt rotator is separated from the folding rotator.

In the third type when the first light module is detached from the middle bar, the tilt rotator is separated from the middle bar.

In some embodiments, when the first light module or the second light module is detached from the bracket station, they can be used independently. In such case, the first light module or the second light module may have a foldable stand.

Such foldable stand is retracted when the first light module or the second light module is attached to the station bracket. The foldable stand of the first light module or the second module reaches out to set a tilt angle of the first light module or the second light module when the first light module or the second light module is detached from the bracket station.

In some embodiments, the bottom base of the bracket station is a H shape structure having a central bar connected with two perpendicularly connected tubes.

In some embodiments, the middle bar is detachable from the bottom base and the middle bar has a sharpen bottom to be inserted into the ground to fix the portable working light apparatus, when the middle bar is detached from the bottom base. It is just like a camping pin to fix a tent by inserting the pin into the ground when the ground is soft like soil or grass field.

In some embodiments, the handle bar is bendable. This design makes users easier to handle the portable working light apparatus just like holding a candle station.

In some other embodiments, instead of the middle bar, the handle bar has a sharpen end to be inserted to the ground and a detachable cap is used for preventing the sharpen end to hurt people. When using such design, a user needs to invert the first light module and the second light module upside down.

In some embodiments, the bracket station has a battery for supplying power to the first light module and the second light module. Battery may cost some money, but also enhances stability for its weight. In addition, the first light module or the second light module may have different operating parameters depending on whether they are attached to the bracket station or detached from the bracket station and used independently.

The first light module and the second light module may have different optical characteristic. For example, the first light module may emit soft environment light while the second light module emits focused light beam for particularly emphasize an object in front of the light beam.

The first light module and the second light module may have internal batteries to be portable and operated independently.

In some embodiments, the first light module has a front panel, a reflector, a LED module, a waterproof sealing ring, a box for containing a driver circuit and a battery. The second light module may have the same configuration as the first light module. Or, the first light module and the second light module may be completely different.

In some embodiments, the bracket station may include a mobile phone holder for holding a mobile phone for taking photos. In such case, the first light module and the second light module may help provide light necessary for taking photos.

There are other variations not mentioned but are supposed to be covered with the disclosure and examples as illustrated as follows.

DETAILED DESCRIPTION

Figure 1:
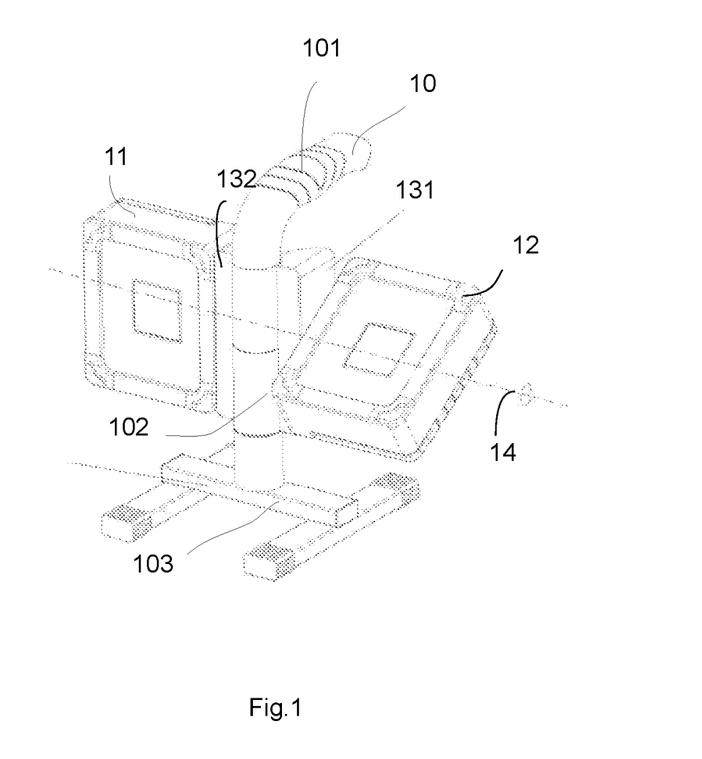
FIG. 1 illustrates an embodiment of a portable working light apparatus.

Please refer to FIG. 1. FIG. 1 illustrates an embodiment of a portable working light apparatus.

In FIG. 1, the portable working light apparatus has a bracket station 10, a first light module 11 and a second light module 12. The bracket station, in this example, has a handle bar 101, a middle bar 102 and a bottom base 103.

The handle bar 10, in this example is bendable so that users may easily and conveniently hold the portable working light apparatus. The first light module 11 is connected to the middle bar 102 with a first joint rotator 132. The second light module 12 is connected to the middle bar 102 with a second joint rotator 131.

In FIG. 1, it is also illustrated that the second light module 12 is rotated along a virtual axis to change its tilt angle with respect to a ground surface, where the portable working light apparatus is placed.

Figure 2:
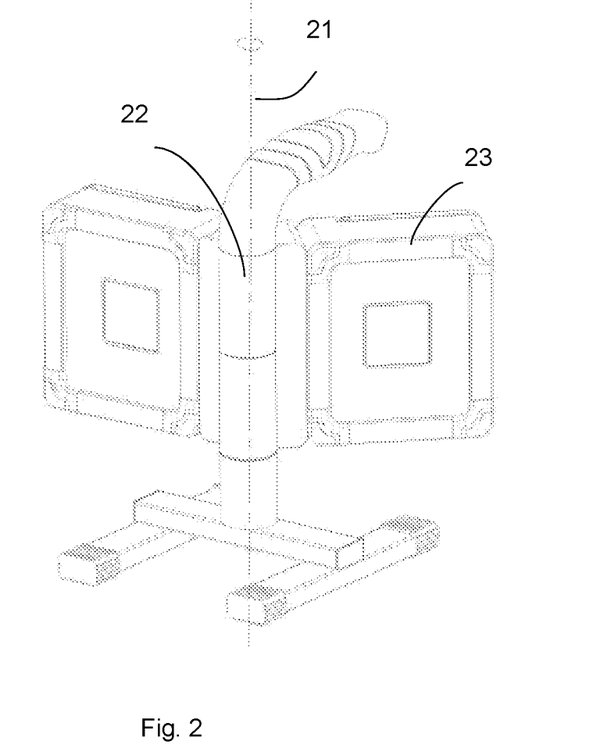
FIG. 2 illustrates a different operation status of the embodiment of FIG. 1.

Please refer to FIG. 2. FIG. 2 illustrates a different operation status of the embodiment of FIG. 1.

In FIG. 2, it is illustrated that the second light module 23 is rotated along a virtual axis 21, i.e. a folding operation to adjust a folding angle of the second light module 23 with respect to the middle bar 22.

Figure 3:
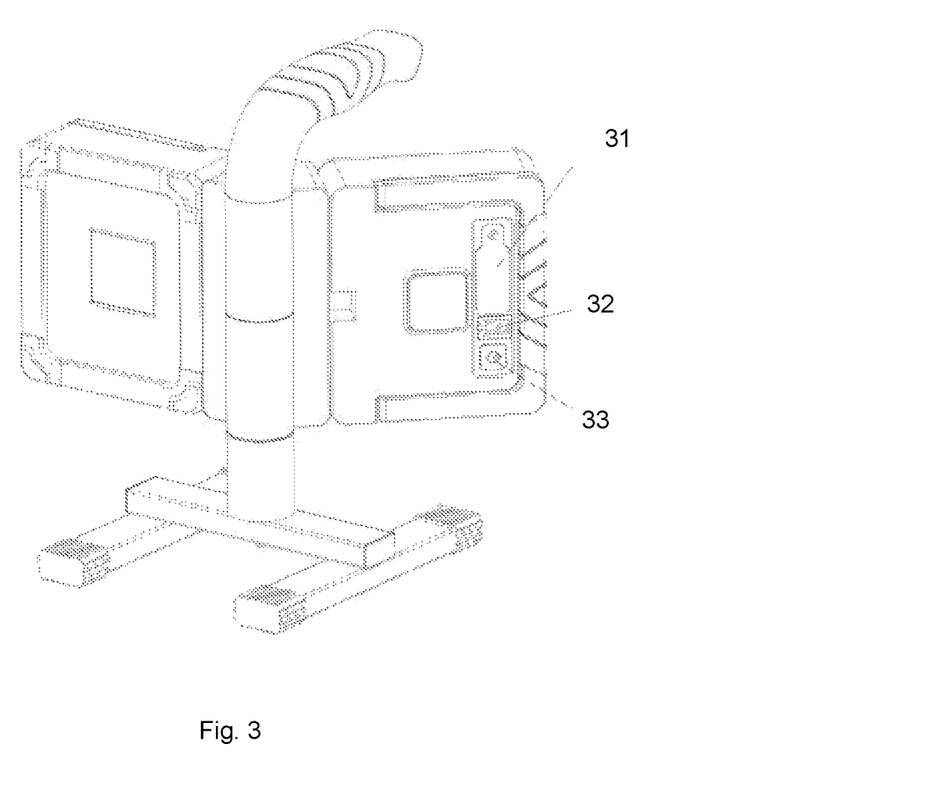
FIG. 3 illustrates another operation status of the embodiment of FIG. 1.

Please refer to FIG. 3. FIG. 3 illustrates another operation status of the embodiment of FIG. 1.

In FIG. 3, the second light module is rotated with 180 degrees and its back is now facing the front side. In the back of the second light module, a cover 31 for installing a battery, an indicator 32 for showing batter status and a power switch are provided for users to operate the light module.

Figure 4:
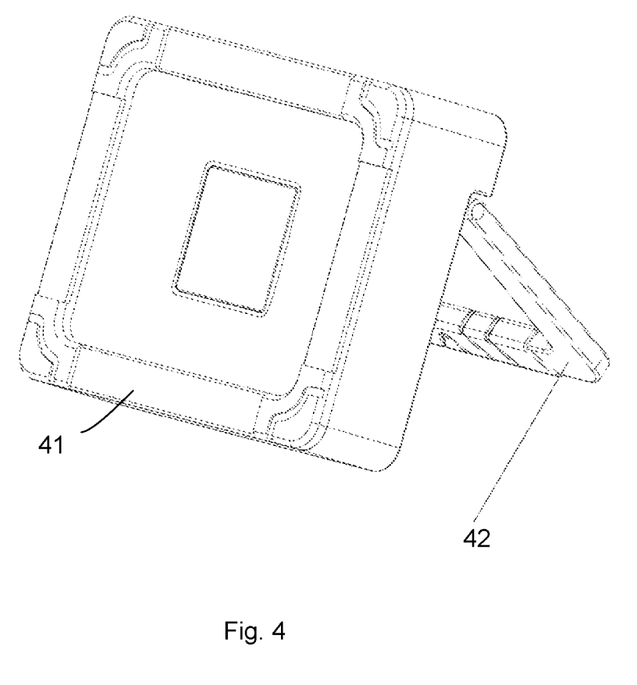
FIG. 4 illustrates a light module being used separately.

Please refer to FIG. 4. FIG. 4 illustrates a light module being used separately.

In FIG. 4, the light module 41 has a foldable stand that can be retracted when the light module 41 is attached to a bracket station as mentioned above.

When the light module is detached and used independently, the foldable stand may reach out to provide a tilt angle of the light module to better user experience.

Figure 5:
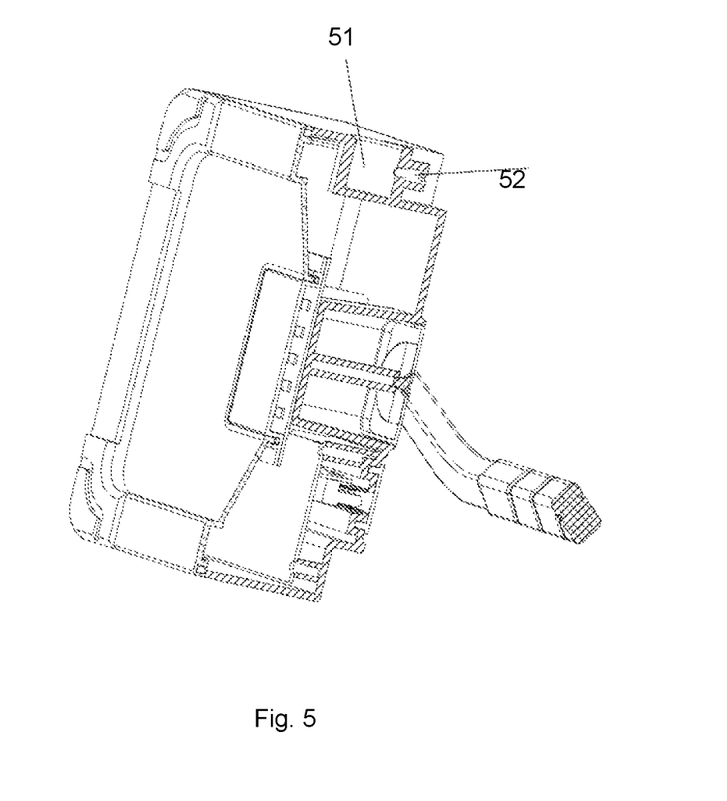
FIG. 5 illustrates a cross-sectional view of components of a light module.

Please refer to FIG. 5. FIG. 5 illustrates a cross-sectional view of components of a light module.

In FIG. 5, the light module 51 has a slot and a protruding block 52. Such structure may be used for hooking the light module to a rotation joint or the main body of the bracket station as mentioned above.

Figure 6:
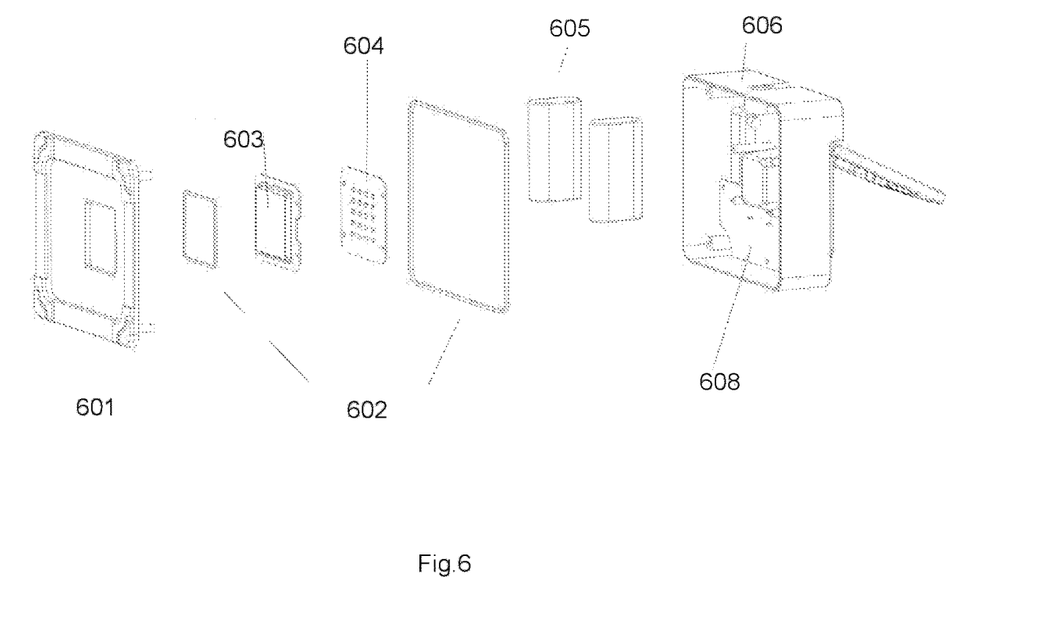
FIG. 6 illustrates an explosive component diagram of a light module embodiment.

Please refer to FIG. 6. FIG. 6 illustrates an explosive component diagram of a light module embodiment.

In FIG. 6, the portable working light apparatus has a reflector 601, waterproof sealing rings 602, transparent cover 603, a LED plate 604, two batteries 605, a heat sink housing 606 for containing a driver circuit 608.

Figure 7:
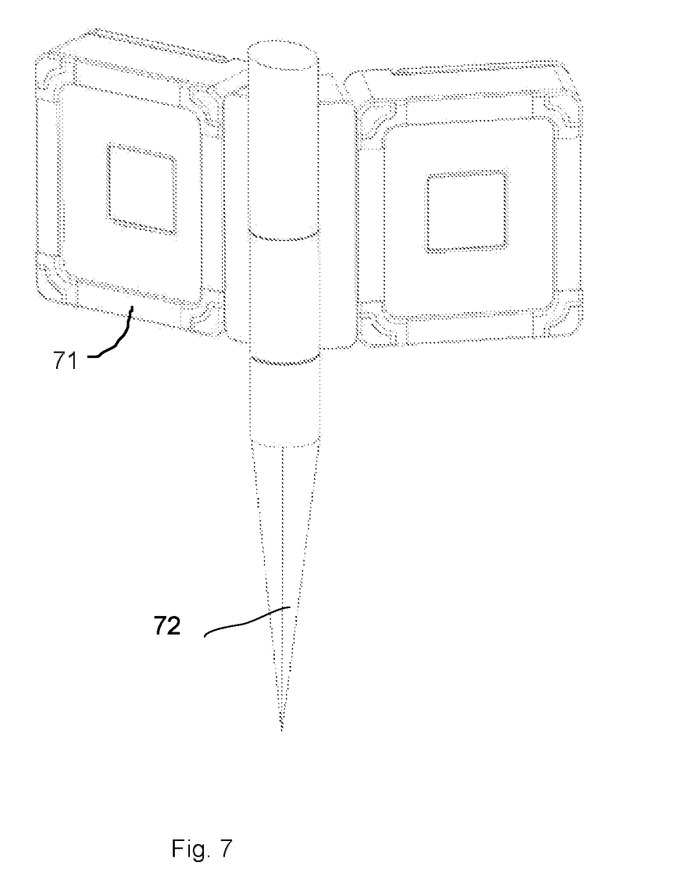
FIG. 7 illustrates a different operation status in another embodiment.

Please refer to FIG. 7. FIG. 7 illustrates a different operation status in another embodiment.

In FIG. 7, the portable working light apparatus 71 may change a fixing method. In this example, the middle bar of the bracket station has a sharpen end 72 to be inserted into a ground just like a camping pin.

According to an embodiment of the present invention, a portable working light apparatus has a station bracket, a first light module and a second light module.

The station bracket includes a handle bar, a middle bar and a bottom base. The handle bar and the bottom base are connected to the middle bar. The bottom base is used to be placed on a horizontal surface.

The first light module is disposed at a left side of the middle bar. The first light module is connected to the middle bar via a first joint connector. The first light module is rotatable with respect to the middle bar along the first joint.

Similarly, the second light module is disposed at a right side of the middle bar. The second light module is connected to the middle bar via a second joint connector. The second light module is rotatable with respect to the middle bar along the second joint connector.

In addition, the first light module and the second light module are detachable from the station bracket.

Figure 8A:
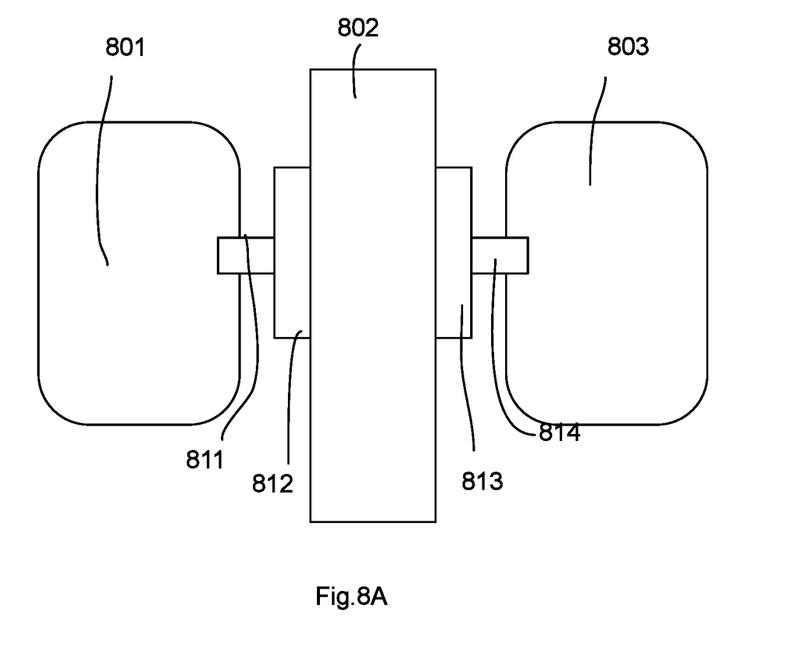
FIG. 8A illustrates a first case of joint rotator implementation.

Please refer to FIG. 8A. FIG. 8A illustrates a first case of joint rotator implementation. In a first case in some embodiments, the first joint connector includes a first tilt rotator 811 and a first folding rotator 812. The first light module 801 and the second light module 803 are connected to the first tilt rotator 811 and the second tilt rotator 814, the first tilt rotator 811 and the second tilt rotator 814 are connected to the first folding rotator 812 and the second folding rotator 813, and the first folding rotator 812 and the second folding rotator 814 are connected to the middle bar 802.

The first light module is rotated along the tilt rotator to change a tilt angle with respect to the horizontal surface. The first light module is rotated along the folding rotator to change a folding angle with respect to the middle bar.

Since the first light module and the second light module may be detachable from the bracket station, there are several types of implementation for the detaching points.

In the first type when the first light module is detached from the middle bar, the first light module is separated from the first tilt rotator.

In the second type when the first light module is detached from the middle bar, the first tilt rotator is separated from the folding rotator.

In the third type when the first light module is detached from the middle bar, the folding rotator is separated from the middle bar.

Figure 8B:
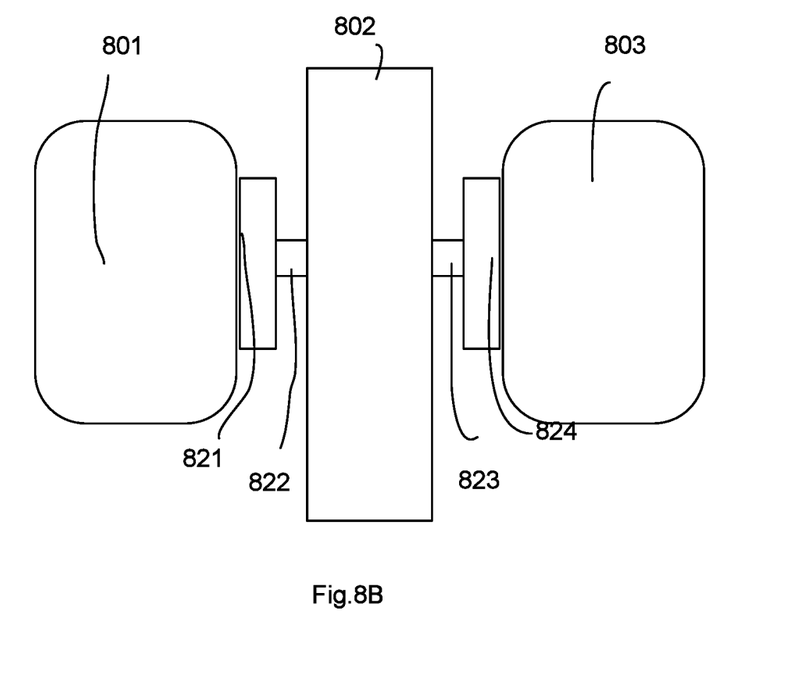
FIG. 8B illustrates a second case of joint rotation implementation.

Now, please refer to FIG. 8B. FIG. 8B illustrates a second case of joint rotation implementation.

In a second case in some other embodiments, the first joint connector includes a first tilt rotator 822 and a first folding rotator 821. The first light module 801 and the second light module 803 are connected to the first folding rotator 821 and the second folding rotator 824, the first folding rotator 821 and the second folding rotator 824 are connected to the first tilt rotator 822 and the second tilt rotator 823, and the first tilt rotator 822 and the second tilt rotator 823 are connected to the middle bar 802.

The first light module is rotated along the tilt rotator to change a tilt angle with respect to the horizontal surface, and the first light module is rotated along the folding rotator to change a folding angle with respect to the middle bar.

Similarly, there are several types of detaching point since the first light module and the second module may be detachable from the bracket station.

In the first type when the first light module is detached from the middle bar, the first light module is separated from the first folding rotator.

In the second type when the first light module is detached from the middle bar, the first tilt rotator is separated from the folding rotator.

In the third type when the first light module is detached from the middle bar, the tilt rotator is separated from the middle bar.

In some embodiments, when the first light module or the second light module is detached from the bracket station, they can be used independently. In such case, the first light module or the second light module may have a foldable stand.

Such foldable stand is retracted when the first light module or the second light module is attached to the station bracket. The foldable stand of the first light module or the second module reaches out to set a tilt angle of the first light module or the second light module when the first light module or the second light module is detached from the bracket station.

In some embodiments, the bottom base of the bracket station is a H shape structure having a central bar connected with two perpendicularly connected tubes.

In some embodiments, the middle bar is detachable from the bottom base and the middle bar has a sharpen bottom to be inserted into the ground to fix the portable working light apparatus, when the middle bar is detached from the bottom base. It is just like a camping pin to fix a tent by inserting the pin into the ground when the ground is soft like soil or grass field.

In some embodiments, the handle bar is bendable. This design makes users easier to handle the portable working light apparatus just like holding a candle station.

In some other embodiments, instead of the middle bar, the handle bar has a sharpen end to be inserted to the ground and a detachable cap is used for preventing the sharpen end to hurt people. When using such design, a user needs to invert the first light module and the second light module upside down.

In some embodiments, the bracket station has a battery for supplying power to the first light module and the second light module. Battery may cost some money, but also enhances stability for its weight. In addition, the first light module or the second light module may have different operating parameters depending on whether they are attached to the bracket station or detached from the bracket station and used independently.

The first light module and the second light module may have different optical characteristic. For example, the first light module may emit soft environment light while the second light module emits focused light beam for particularly emphasize an object in front of the light beam.

The first light module and the second light module may have internal batteries to be portable and operated independently.

In some embodiments, the first light module has a front panel, a reflector, a LED module, a waterproof sealing ring, a box for containing a driver circuit and a battery. The second light module may have the same configuration as the first light module. Or, the first light module and the second light module may be completely different.

In some embodiments, the bracket station may include a mobile phone holder for holding a mobile phone for taking photos. In such case, the first light module and the second light module may help provide light necessary for taking photos.

In addition to the above-described embodiments, various modifications may be made, and as long as it is within the spirit of the same invention, the various designs that can be made by those skilled in the art are belong to the scope of the present invention.

The invention claimed is:

1. A portable working light apparatus, comprising:
a station bracket comprising handle bar, a middle bar and a bottom base, wherein the handle bar and the bottom base are connected to the middle bar, and the bottom base is used to be placed on a horizontal surface;
a first light module disposed at a left side of the middle bar, the first light module being connected to the middle bar via a first joint connector, the first light module being rotatable with respect to the middle bar along the first joint; and
a second light module disposed at a right side of the middle bar, the second light module being connected to the middle bar via a second joint connector, the second light module being rotatable with respect to the middle bar along the second joint connector,
wherein the first light module and the second light module are detachable from the station bracket;
wherein the first joint connector comprises a first tilt rotator and a first folding rotator, the first light module is connected to the first folding rotator, the first folding rotator is connected to the first tilt rotator, and the first tilt rotator is connected to the middle bar, and wherein the first light module is rotated along the tilt rotator to change a tilt angle with respect to the horizontal surface, and the first light module is rotated along the folding rotator to change a folding angle with respect to the middle bar.

2. The portable working light apparatus of claim 1, wherein the first joint connector comprises a first tilt rotator and a first folding rotator, the first light module is connected to the first tilt rotator, the first tilt rotator is connected to the first folding rotator, and the first folding rotator is connected to the middle bar, and wherein the first light module is rotated along the tilt rotator to change a tilt angle with respect to the horizontal surface, and the first light module is rotated along the folding rotator to change a folding angle with respect to the middle bar.

3. The portable working light apparatus of claim 2, wherein when the first light module is detached from the middle bar, the first light module is separated from the first tilt rotator.

4. The portable working light apparatus of claim 2, wherein when the first light module is detached from the middle bar, the first tilt rotator is separated from the folding rotator.

5. The portable working light apparatus of claim 2, wherein when the first light module is detached from the middle bar, the folding rotator is separated from the middle bar.

6. The portable working light apparatus of claim 1, wherein when the first light module is detached from the middle bar, the first light module is separated from the first folding rotator.

7. The portable working light apparatus of claim 1, wherein when the first light module is detached from the middle bar, the first tilt rotator is separated from the folding rotator.

8. The portable working light apparatus of claim 1, wherein when the first light module is detached from the middle bar, the tilt rotator is separated from the middle bar.

9. The portable working light apparatus of claim 1, wherein the bottom base of the bracket station is a H shape structure having a central bar connected with two perpendicularly connected tubes.

10. The portable working light apparatus of claim 1, wherein the middle bar is detachable from the bottom base and the middle bar has a sharpen bottom to be inserted into the ground to fix the portable working light apparatus, when the middle bar is detached from the bottom base.

11. The portable working light apparatus of claim 1, wherein lights emitted by the first light module and the second light module have different characteristics.

12. The portable working light apparatus of claim 1, wherein the handle bar is bendable.

13. The portable working light apparatus of claim 1, wherein the handle bar has a sharpen end to be inserted to the ground and a detachable cap is used for preventing the sharpen end to hurt people.

14. The portable working light apparatus of claim 1, wherein the bracket station has a battery for supplying power to the first light module and the second light module.

15. The portable working light apparatus of claim 1, wherein the first light module and the second light module respectively have internal batteries.

16. The portable working light apparatus of claim 1, wherein the first light module and the second light module have first operating parameters when the first light module and the second light module are attached to the bracket station, and the first light module and the second light module have second operating parameters when the first light module and the second light module are detached from the bracket station and use internal batteries, the first operating parameters are different from the second operating parameters.

17. The portable working light apparatus of claim 1, wherein the first light module has a front panel, a reflector, a LED module, a waterproof sealing ring, a box for containing a driver circuit and a battery.

18. The portable working light apparatus of claim 1, further comprising a mobile phone holder for holding a mobile phone for taking photos.

* * * * *